(12) United States Patent
Sharples et al.

(10) Patent No.: US 8,181,627 B2
(45) Date of Patent: May 22, 2012

(54) SECURING THROTTLE AREA IN A COORDINATED TORQUE CONTROL SYSTEM

(75) Inventors: Kevin T. Sharples, Pinkney, MI (US); Mark H. Costin, Bloomfield Township, MI (US); Timothy J. Hartrey, Brighton, MI (US); Christopher E. Whitney, Highland, MI (US); Bahram Younessi, Farmington, MI (US); Weixin Yan, Novi, MI (US); Jeffrey M. Kaiser, Highland, MI (US); Richard B. Jess, Haslett, MI (US); Joseph M. Stempnik, Warren, MI (US); John A. Jacobs, Fenton, MI (US); Jinchun Peng, Westland, MI (US); Leonard G. Wozniak, Ann Arbor, MI (US); Vivek Mehta, Bloomfield Hills, MI (US); Bruce A. Rogers, Novi, MI (US)

(73) Assignee: GM Global Technology Operations LLC

( * ) Notice: Subject to any disclaimer, the term of this patent is extended or adjusted under 35 U.S.C. 154(b) by 771 days.

(21) Appl. No.: 12/367,886

(22) Filed: Feb. 9, 2009

(65) Prior Publication Data

US 2010/0075803 A1    Mar. 25, 2010

Related U.S. Application Data

(60) Provisional application No. 61/099,638, filed on Sep. 24, 2008.

(51) Int. Cl.
*F02D 41/00* (2006.01)
*B60K 31/00* (2006.01)

(52) U.S. Cl. .......................... 123/319; 123/361; 180/177

(58) Field of Classification Search .................. 123/319, 123/361, 399, 403, 352; 180/176, 177, 179; 701/54, 110

See application file for complete search history.

(56) References Cited

U.S. PATENT DOCUMENTS

| | | | | |
|---|---|---|---|---|
| 5,046,177 | A * | 9/1991 | Vahabzadeh | 701/54 |
| 5,524,724 | A * | 6/1996 | Nishigaki et al. | 123/361 |
| 6,947,824 | B1 * | 9/2005 | Livshiz et al. | 123/361 |
| 7,476,178 | B2 * | 1/2009 | Tohta et al. | 477/107 |

FOREIGN PATENT DOCUMENTS

| | | | |
|---|---|---|---|
| JP | 05301535 | A * | 11/1993 |
| JP | 2009113685 | A * | 5/2009 |

* cited by examiner

*Primary Examiner* — Hieu T Vo

(57) ABSTRACT

An engine system includes a throttle actuator module and a torque control module. The throttle actuator module controls a throttle actuator based on a desired throttle area. The torque control module determines an actuator torque. The torque control module determines a rate limited torque, a maximum torque, and a minimum torque based on the actuator torque and a predetermined rate of change. The torque control module determines the desired throttle area based on the actuator torque when the rate limited torque is greater than the maximum torque. The torque control module determines the desired throttle area based on the actuator torque when the rate limited torque is less than the minimum torque.

24 Claims, 7 Drawing Sheets

SECURING THROTTLE AREA IN A COORDINATED TORQUE CONTROL SYSTEM

CROSS-REFERENCE TO RELATED APPLICATIONS

This application claims the benefit of U.S. Provisional Application No. 61/099,638, filed on Sep. 24, 2008. The disclosure of the above application is incorporated herein by reference.

FIELD

The present disclosure relates to the control of vehicle actuators to achieve a desired engine torque, and more particularly to securing the conversion of desired engine torque to desired throttle area.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

An engine system comprises a throttle actuator module and a torque control module. The throttle actuator module controls a throttle actuator based on a desired throttle area. The torque control module determines an actuator torque. The torque control module determines a rate limited torque, a maximum torque, and a minimum torque based on the actuator torque and a predetermined rate of change. The torque control module determines the desired throttle area based on the actuator torque when the rate limited torque is greater than the maximum torque. The torque control module determines the desired throttle area based on the actuator torque when the rate limited torque is less than the minimum torque.

An engine control method comprises controlling a throttle actuator based on a desired throttle area and determining an actuator torque. Additionally, the method comprises determining a rate limited torque, a maximum torque, and a minimum torque based on the actuator torque and a predetermined rate of change. The method further comprises determining the desired throttle area based on the actuator torque when the rate limited torque is greater than the maximum torque and when the rate limited torque is less than the minimum torque.

BRIEF DESCRIPTION OF THE DRAWINGS

The present disclosure will become more fully understood from the detailed description and the accompanying drawings, wherein.

DETAILED DESCRIPTION

Figure 1:
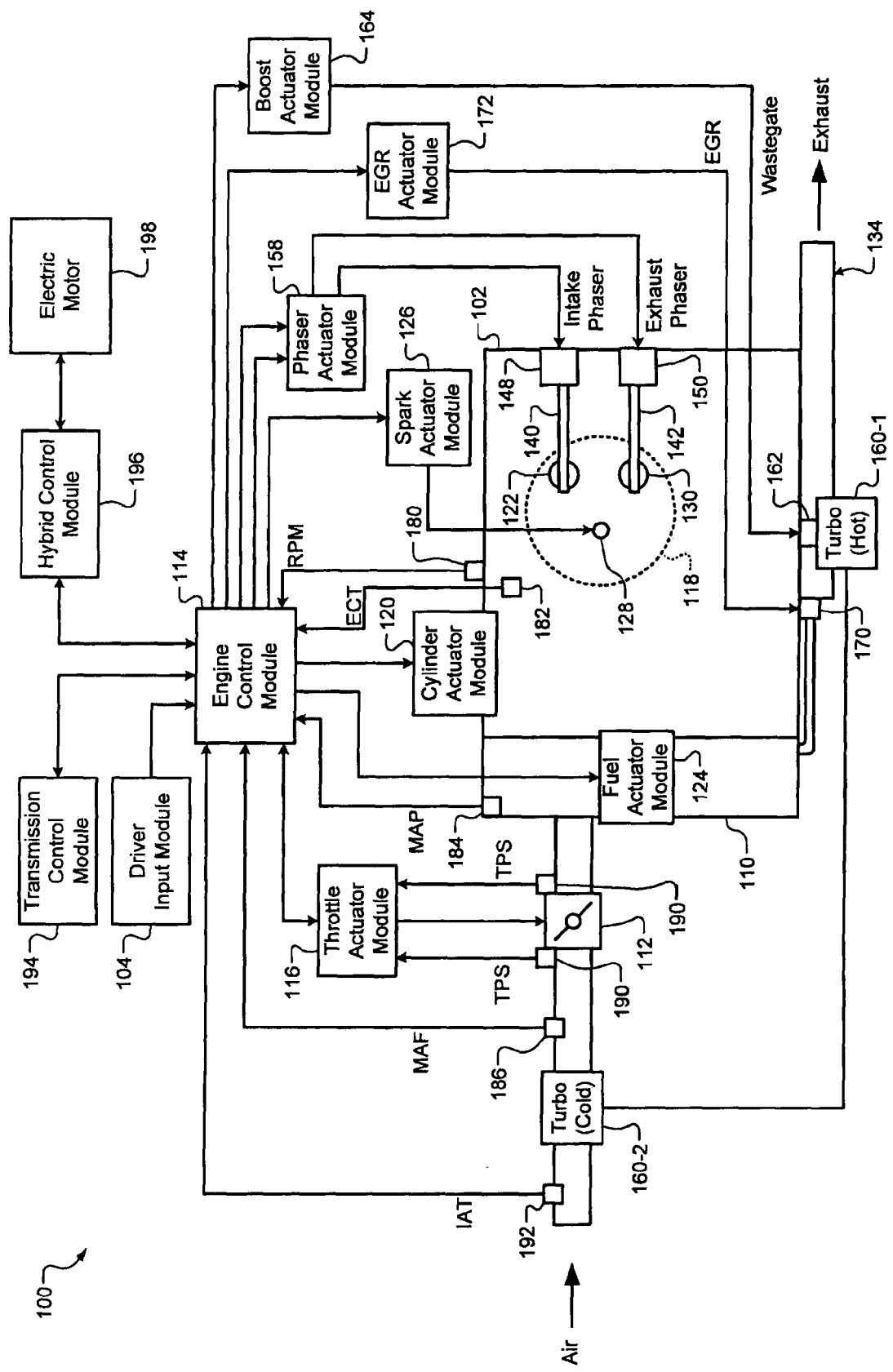
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Engine control systems control torque output. Accuracy of engine control systems partly depends on robust detection of errors in torque calculations. A torque monitoring system according to the present disclosure provides a robust error detection system for detecting errors in torque calculations. The system includes diagnostics that determine bounds for calculations based on rate limiting functions. The diagnostics apply corrections to the torque calculations that fall outside of the bounds.

Referring now to FIG. 1, a functional block diagram of an exemplary engine system 100 is presented. The engine system 100 includes an engine 102 that combusts an air/fuel mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110. The ECM 114 may implement the torque monitoring system of the present disclosure.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. A piston (not shown) within the cylinder 118 compresses the air/fuel mixture. Based upon a signal from the ECM 114, a spark actuator module 126 energizes a spark plug 128 in the cylinder 118, which ignites the air/fuel mixture. The timing of the spark may be specified relative to the time when the piston is at its topmost position, referred to as top dead center (TDC).

The combustion of the air/fuel mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 1 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112.

In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 2:
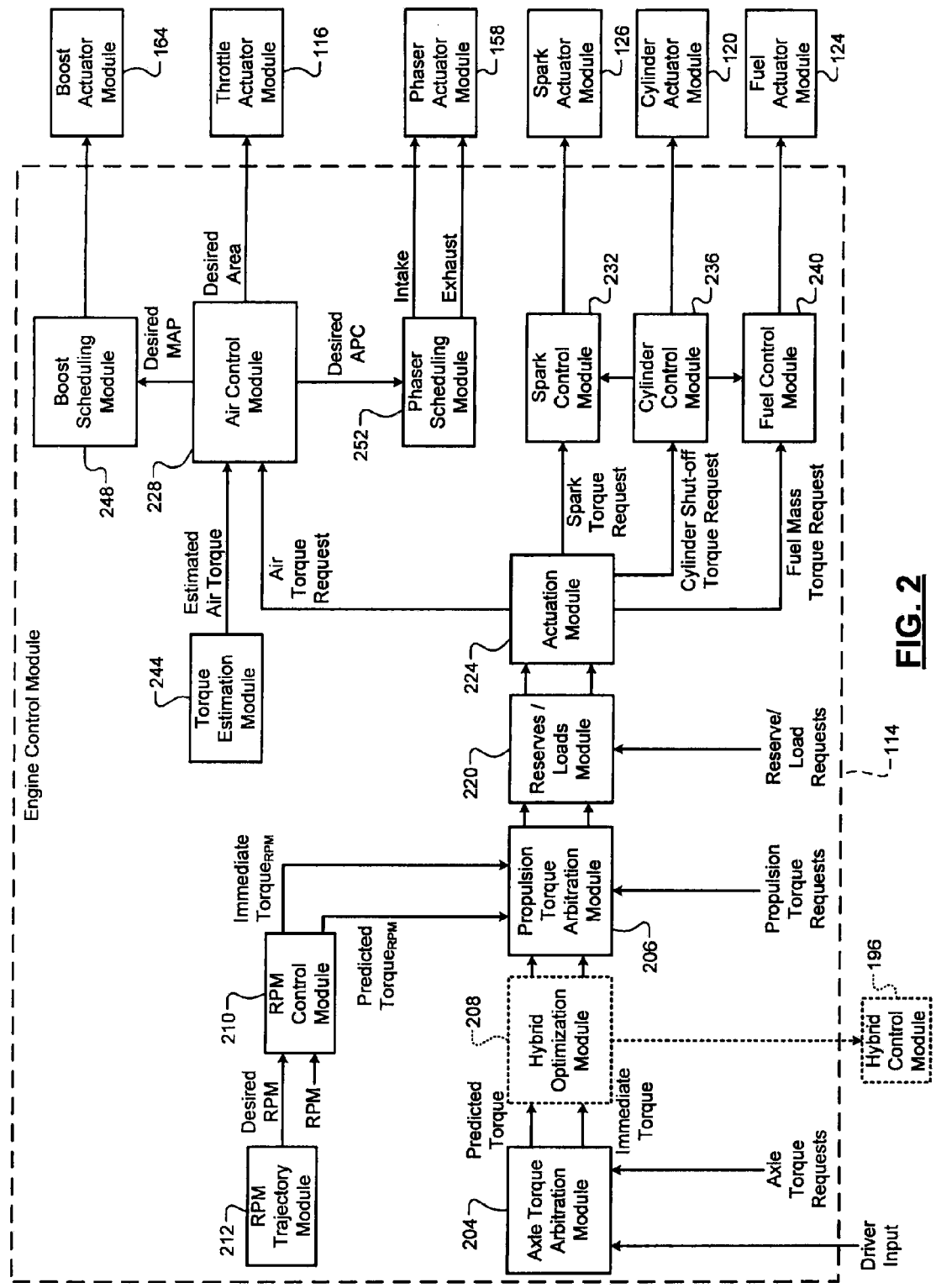
FIG. 2 is a functional block diagram of an exemplary engine control module according to the principles of the present disclosure.

Referring now to FIG. 2, a functional block diagram of the ECM 114 according to the present disclosure is presented. The ECM 114 may implement the torque monitoring system of the present disclosure to provide for detection and correction of torque calculation errors.

The ECM 114 includes an axle torque arbitration module 204. The axle torque arbitration module 204 arbitrates between a driver input from the driver input module 104 and other axle torque requests. For example, the driver input may be based on position of an accelerator pedal. The driver input may also be based on cruise control, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 204 may output the predicted torque and the immediate torque to a propulsion torque arbitration module 206. In various implementations, the axle torque arbitration module 204 may output the predicted torque and immediate torque to a hybrid optimization module 208. The hybrid optimization module 208 determines how much torque should be produced by the engine 102 and how much torque should be produced by the electric motor 198. The hybrid optimization module 208 then outputs modified predicted and immediate torque values to the propulsion torque arbitration module 206. In various implementations, the hybrid optimization module 208 may be implemented in the hybrid control module 196.

The predicted and immediate torques received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve by increasing the predicted torque request.

For example only, a catalyst light-off process or a cold start emissions reduction process may directly vary spark advance for an engine. The reserves/loads module 220 may therefore increase the predicted torque request to counteract the effect of that spark advance on the engine torque output. In another example, the air/fuel ratio of the engine and/or the mass air flow may be directly varied, such as by diagnostic intrusive equivalence ratio testing and/or new engine purging. Corresponding predicted torque requests may be made to offset changes in the engine torque output during these processes.

The reserves/loads module 220 may also create a reserve in anticipation of a future load, such as the engagement of the air conditioning compressor clutch or power steering pump operation. The reserve for air conditioning (A/C) clutch engagement may be created when the driver first requests air conditioning. Then, when the A/C clutch engages, the reserves/loads module 220 may add the expected load of the A/C clutch to the immediate torque request.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators.

An air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positons. In various implementations, the air control module 228 may also determine an amount of opening of the EGR valve 170. The air control module 228 may implement the torque monitoring system of the present disclosure to provide detection and correction of errors that may occur during the conversion of air torque to the desired throttle area.

In gas systems, the actuation module 224 may also generate a spark torque request, a cylinder shut-off torque request, and a fuel mass torque request. The spark torque request may be used by a spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct a fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric air/fuel ratio.

The fuel control module 240 may increase the fuel mass above the stoichiometric value to increase engine torque output and may decrease the fuel mass to decrease engine torque output. In various implementations, the fuel control module 240 may receive a desired air/fuel ratio that differs from stoichiometry. The fuel control module 240 may then determine a fuel mass for each cylinder that achieves the desired air/fuel ratio. In diesel systems, fuel mass may be the primary actuator for controlling engine torque output.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 244 may estimate torque output of the engine 102. This estimated torque may be used by the air control module 228 to perform closed-loop control of engine air flow parameters, such as throttle area, MAP, and phaser positions. For example only, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions.

While the actual spark advance may be used to estimate torque, when a calibrated spark advance value is used to estimate torque, the estimated torque may be called an estimated air torque. The estimated air torque is an estimate of how much torque the engine could generate at the current air flow if spark retard was removed (i.e., spark advance was set to the calibrated spark advance value).

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may generate the desired area signal based on an inverse torque model and the air torque request. The air control module 228 may use the estimated air torque and/or the MAF signal in order to perform closed loop control. For example, the desired area signal may be controlled to minimize a difference between the estimated air torque and the air torque request.

The air control module 228 may also generate a desired air per cylinder (APC) signal, which is output to a phaser scheduling module 252. Based on the desired APC signal and the RPM signal, the phaser scheduling module 252 may control positions of the intake and/or exhaust cam phasers 148 and 150 using the phaser actuator module 158.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#). \quad (2)$$

This relationship may be embodied as an equation and/or as a lookup table. The air/fuel ratio (AF) may be the actual ratio, as indicated by the fuel control module 240.

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

The air control module 228 includes the torque monitoring system according to the present disclosure. The system determines bounds for torque calculations based on rate limiting functions and applies corrections to the torque calculations that fall outside of the bounds. The system may be divided into separate torque monitoring modules. Each will now be discussed in turn.

Figure 3:
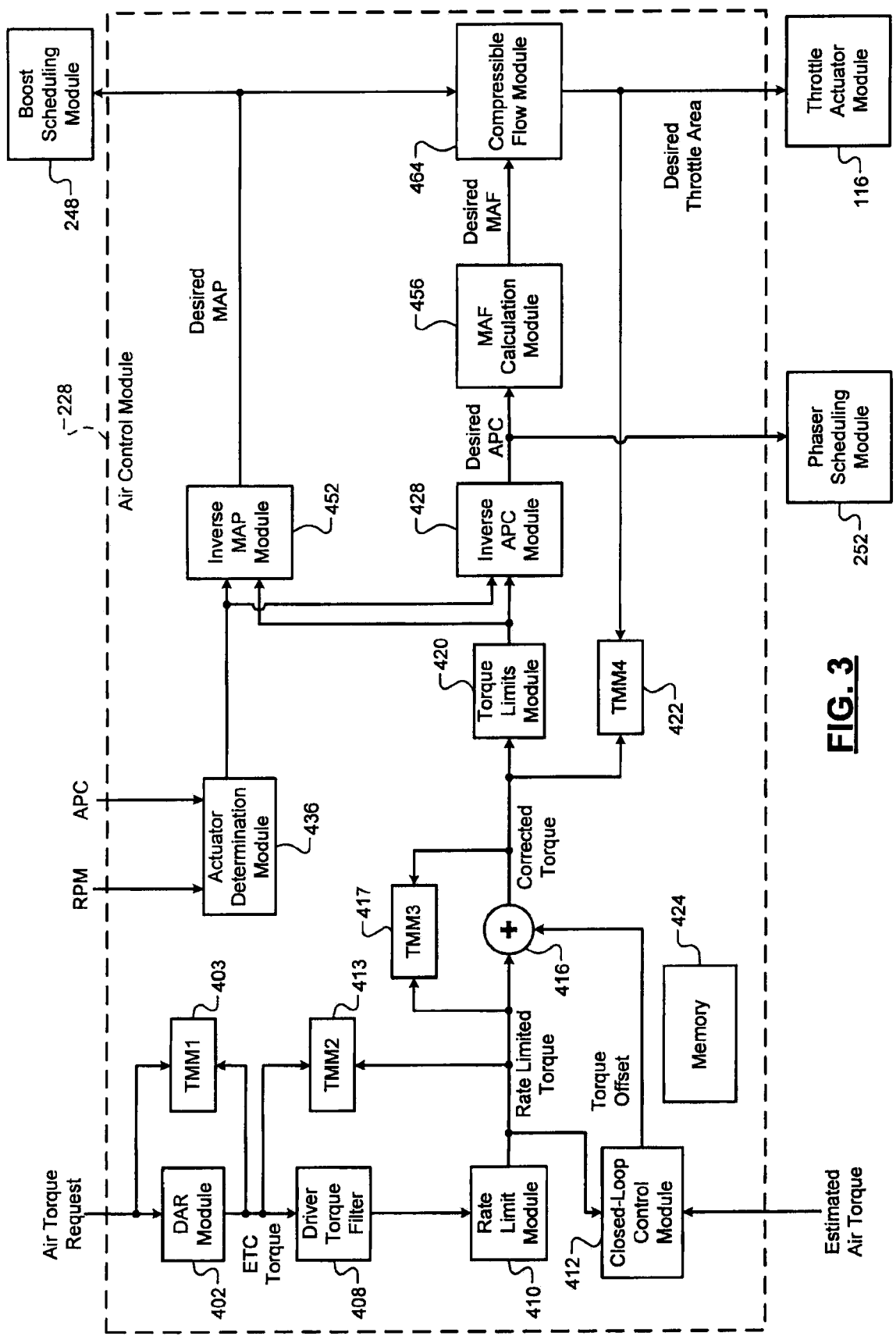
FIG. 3 is a functional block diagram of an exemplary air control module according to the principles of the present disclosure.

Referring now to FIG. 3, a functional block diagram of an exemplary implementation of the air control module 228 is presented. A torque monitoring module (TMM) may be divided into 4 TMMs: TMM1 403, TMM2 413, TMM3 417, and TMM4 422. In general, each TMM 403, 413, 417, 422 checks the calculations of other modules included in the air control module 228. If the calculations of any of the modules fail, the respective TMM 403, 413, 417, 422 supplies a torque value to the other modules. TMM1 403 and TMM2 413 may set a failure if the checks performed by TMM1 403 and TMM2 413 fail for a predetermined period. The predetermined period may be based on a continuous timer, a loop iteration counter, or a counter that determines that a number of errors have occurred within a predetermined number of prior iterations.

A failure may instruct the ECM 114 to take remedial actions. Remedial actions may include the following. For example only, the engine may be shutdown. The engine may be forced to idle by ignoring the accelerator pedal. Power to the engine may be reduced by limiting the throttle opening. A malfunction indicator light may be set.

A determine actuation request (DAR) module 402 and TMM1 403 receive the air torque request from the actuation module 224. The DAR module 402 divides the air torque request into actuator specific torque requests. The DAR module 402 outputs a desired electronic throttle control (ETC) torque request to a driver torque filter 408 and TMM1 403. The driver torque filter 408 may filter out high frequency torque changes. The high frequency torque changes may be generated, for example, when a driver modulates the accelerator pedal while driving on rough road.

TMM1 403 verifies the calculations of the DAR module 402 by performing a check based on air torque and ETC torque. If TMM1 403 determines that ETC torque is greater than air torque plus a corresponding offset, TMM1 403 instructs the driver torque filter 408 to use the minimum of air torque and ETC torque for subsequent calculations. A failure is set if ETC torque exceeds air torque plus the corresponding offset for a predetermined period. The predetermined period may be approximately 200 ms.

The driver torque filter 408 outputs a filtered ETC torque request to a rate limit module 410. The rate limit module 410 determines a rate limited torque request. The rate limited torque may be based on a vehicle acceleration threshold. For example only, the vehicle acceleration threshold may be based on a vehicle acceleration above driver intent by 0.18-0.2 g in a 200 ms time frame. The rate limit module 410 outputs the rate limited torque to a closed-loop control module 412, a summation module 416, TMM2 413, and TMM3 417.

TMM2 413 verifies the calculations of the driver torque filter 408 and the rate limit module 410 by performing a check on the rate limited torque. TMM2 413 receives ETC torque and determines acceptable maximum and minimum values for the rate limited torque. The acceptable maximum and minimum values may be based on a predetermined rate of change and the ETC torque. The acceptable maximum and minimum values may also be based on offset values Cal_1 and Cal_2. The rate of change, Cal_1, and Cal_2 may be based on a vehicle acceleration threshold (e.g., 0.18-0.2 g in 200 ms). TMM2 413 receives the rate limited torque and determines if the rate limited torque lies outside the bounds of the acceptable maximum and minimum values. TMM2 413 instructs the closed-loop control module 412, summation module 416, and TMM3 417 to use the ETC torque value instead of the rate limited torque value if the rate limited torque value lies outside the bounds. A failure is set if the rate limited torque exceeds the acceptable maximum value or is less than the acceptable minimum value for a predetermined period. The period may be 200 ms for exceeding the maximum acceptable value and 500 ms for falling under the minimum acceptable value.

Figure 4:
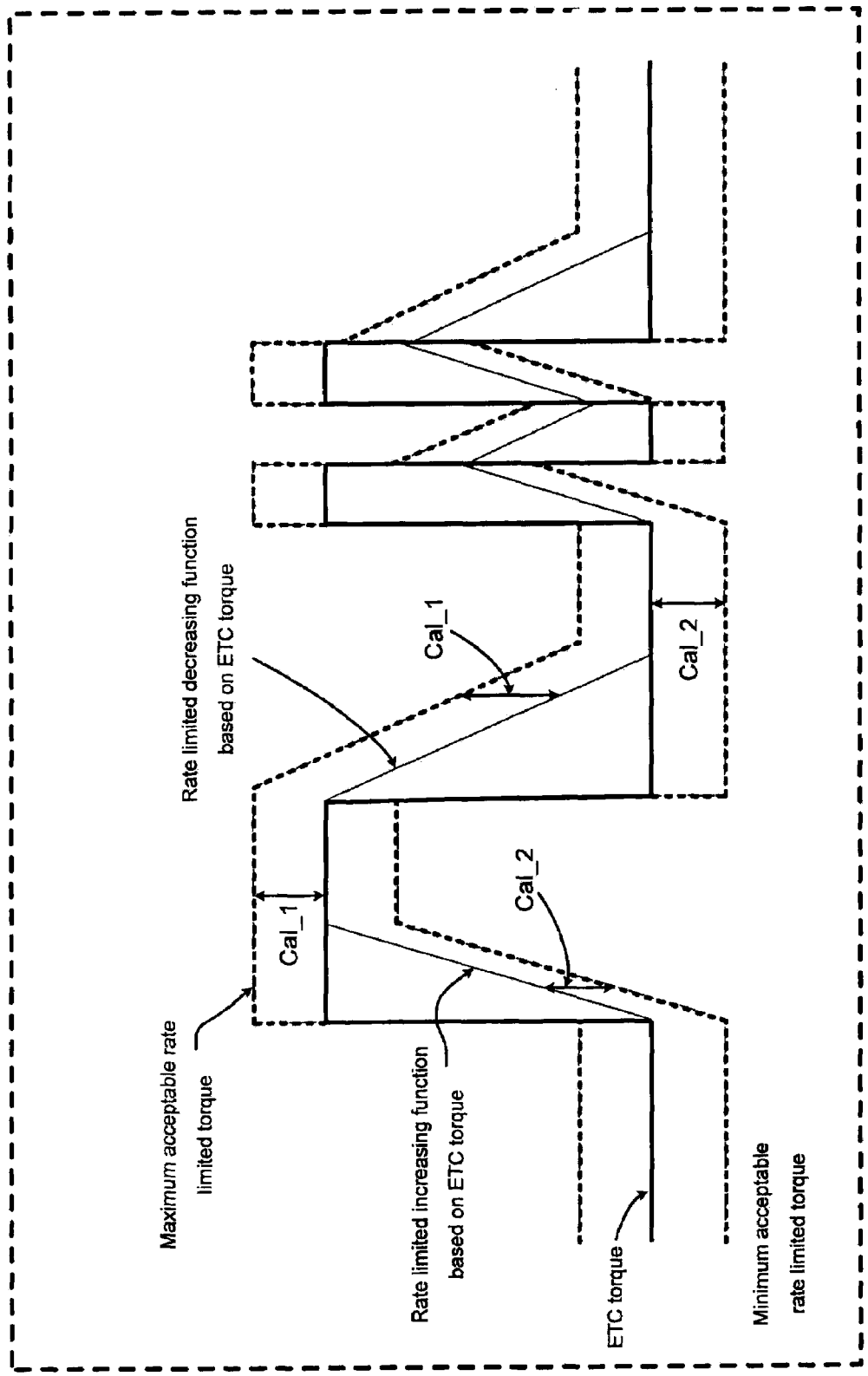
FIG. 4 is a graph that depicts calculations of maximum and minimum acceptable limits for rate limited torque according to the principles of the present disclosure.

Referring now to FIG. 4, TMM2 413 determines acceptable maximum and minimum values for rate limited torque based on ETC torque. The solid bold line shown represents the ETC torque received by TMM2 413. The solid thin line shown represents a rate limited function calculated by TMM2 413 based on ETC torque and the predetermined rate of change. The upper dashed line represents the acceptable maximum value for the rate limited torque. The lower dashed line represents the acceptable minimum value for the rate limited torque.

TMM2 413 determines the acceptable maximum value by selecting the larger of a first calculated sum and a second calculated sum. The first sum is equal to ETC torque plus Cal_1. The second sum is equal to the rate limited function plus Cal_1.

TMM2 413 determines the acceptable minimum value by selecting the smaller of a third calculated sum and a fourth calculated sum. The third calculated sum is equal to ETC torque minus Cal_2. The fourth sum is equal to the rate limited function minus Cal_2.

The rate limited function is composed of increasing, zero slope, and decreasing portions. The slopes of the increasing and decreasing portions are determined by the predetermined rate of change. The increasing and decreasing slopes may be based on different predetermined rates of change. The choice of the predetermined rate changes the tolerance of TMM2 413 to changes in rate limited torque.

Referring again to FIG. 3, the closed-loop control module 412 compares the estimated air torque to the rate limited torque and outputs a torque offset to the summation module 416. The summation module 416 determines a corrected torque based on the torque offset and the rate limited torque.

In some implementations, the closed-loop control module 412 may output a torque offset equal to the difference between the rate limited torque and the estimated air torque. Alternatively, the closed-loop control module 412 may use a proportional-integral (PI) control scheme to meet the rate limited torque received from the rate limit module 410. The torque offset may include a proportional term determined based on the difference between the rate limited torque and the estimated air torque. The torque offset may also include an integral term determined based on an integral of the difference between the rate limited torque and the estimated air torque. The torque offset $T_{offset}$, which is output to the summation module 416, may be determined by the following equation:

$$T_{offset}=K_p*(T_{rate\text{-}limited}-T_{estimated})+K_i*\int(T_{rate\text{-}limited}-T_{estimated})\partial t, \quad (1)$$

where $K_p$ is a pre-determined proportional constant, and $K_i$ is a pre-determined integral constant.

TMM3 417 checks the computations of the closed-loop control module 412 and the summation module 416. TMM3 417 receives a calculated proportional term from the closed-loop control module 412. TMM3 compares the magnitude of the proportional term to a proportional offset (PCal). (PCal) may be a predetermined torque limit based on a vehicle acceleration threshold (e.g., 0.18-0.2 g in 200 ms). TMM3 417 checks that the proportional term is not less than (−PCal) and not greater than (PCal). TMM3 417 instructs the summation module 416 to use a proportional term equal to zero if the calculated proportional term is outside the range of (−PCal) to (PCal). TMM3 417 stores the proportional term in memory 424 for use in a summation check. TMM3 417 may check the stored proportional term for corruption.

TMM3 417 receives a calculated integral term from the closed-loop control module 412 and checks the integral term magnitude and integral term rate of change. TMM3 417 compares the magnitude of the integral term to an integral offset (ICal). (ICal) may be a predetermined torque limit based on a vehicle acceleration threshold (e.g., 0.18-0.2 g in 200 ms). If the magnitude of the integral term is greater than (ICal) or less than (−ICal), the check fails. The integral term rate of change is based on a present integral term and a previously stored integral term. If the integral term rate of change is greater than (ICal), the check fails. TMM3 417 instructs the summation module 416 to use a previously stored integral term if the present integral term rate of change or magnitude check fails. TMM3 417 stores the integral term in memory 424 for use in a summation check. The stored integral term may be checked for corruption. TMM3 417 may default the integral term to zero if the corruption check fails for the stored integral term.

TMM3 417 checks the calculation of the summation module 416. TMM3 417 sums the rate limited torque with the PI terms stored in memory 424 to determine a TMM3 sum. TMM3 417 compares the magnitude of the TMM3 sum with the corrected torque determined by the summation module 416. TMM3 417 instructs the torque limits module 420 and TMM4 422 to use the minimum of the TMM3 sum and the corrected torque if the TMM3 sum differs from the corrected torque by more than a predetermined offset.

A torque limits module 420 receives the corrected torque. The torque limits module 420 may apply limits to the corrected torque. For example, an upper limit may be applied to protect against invalid torque requests or torque requests that would damage the engine. The torque limits module 420 may also apply a lower limit to prevent stalling the engine. The upper and lower limits may be determined from memory 424 and may be based on RPM. The torque limits module 420 outputs the corrected torque, as limited, to an inverse APC module 428 and an inverse MAP module 452.

The air control module 228 includes an actuator determination module 436 that receives RPM and APC signals and determines desired actuator positions. The desired actuator positions may include intake and exhaust cam phaser positions, the spark advance, and air/fuel ratio. The intake and exhaust cam phaser positions and the spark advance may be functions of RPM and APC. The air/fuel ratio may be a function of APC.

The APC value may be filtered before being used to determine one or more of the desired actuator positions. For example, the air/fuel ratio may be determined based on a filtered APC. The actuator determination module 436 outputs the desired actuator positions to the inverse MAP module 452 and to the inverse APC module 428.

The inverse APC module 428 receives the desired actuator positions from the actuator determination module 436 and the corrected torque from the torque limits module 420. The inverse APC module 428 may determine a desired APC based on the corrected torque and the desired actuator positions. The inverse APC module 428 may implement a torque model that estimates torque based on the desired actuator positions. The desired actuator positions may include the spark advance (S), the intake (I) and exhaust (E) cam phaser positions, an air/fuel ratio (AF), an oil temperature (OT), and a number of cylinders currently being fueled (#). If the corrected torque ($T_c$) is assumed to be the torque model output, and the desired actuator positions are substituted, the inverse APC module 428 can solve the torque model for the only unknown, the desired APC. This inverse use of the torque model may be represented as follows:

$$APC_{des} = T_{apc}^{-1}(T_c, S, I, E, AF, OT, \#, RPM). \quad (10)$$

The inverse APC module 428 outputs the desired APC to a MAF calculation module 456.

The inverse MAP module 452 receives the desired actuator positions from the actuator determination module 436 and the corrected torque from the torque limits module 420. The inverse MAP module 452 determines a desired MAP based on the corrected torque and the desired actuator positions. The desired MAP may be determined by the following equation:

$$MAP_{des} = T_{map}^{-1}((T_c + f(\text{delta\_T})), S, I, E, AF, OT, \#, RPM), \quad (11)$$

where f(delta_T) is a filtered difference between MAP-based and APC-based torque estimators. The MAF calculation module 456 determines a desired MAF based on the desired APC. The desired MAF may be calculated using the following equation:

$$MAF_{des} = \frac{APC_{des} \cdot RPM \cdot \#}{60 \text{ s/min} \cdot 2 \text{ rev/firing}}. \quad (12)$$

The MAF calculation module 456 outputs the desired MAF to a compressible flow module 464.

The compressible flow module 464 determines the desired throttle area based on the desired MAP value and the desired MAF. The desired throttle area may be calculated using the following equation:

$$Area_{des} = \frac{MAF_{des} \cdot \sqrt{R_{gas} \cdot T}}{P_{baro} \cdot \Phi(P_r)}, \text{ where } P_r = \frac{MAP}{P_{baro}}, \quad (13)$$

and where $R_{gas}$ is the ideal gas constant, T is an intake air temperature, and $P_{baro}$ is a barometric pressure. $P_{baro}$ may be directly measured using a sensor, such as the IAT sensor 192, or may be calculated using other measured or estimated parameters.

The Φ function may account for changes in airflow due to pressure differences on either side of the throttle valve 112. The Φ function may be specified as follows:

$$\Phi(P_r) = \begin{cases} \sqrt{\frac{2\gamma}{\gamma-1}\left(1 - P_r^{\frac{\gamma-1}{\gamma}}\right)} & \text{if } P_r > P_{critical} \\ \sqrt{\gamma\left(\frac{2}{\gamma+1}\right)^{\frac{\gamma+1}{\gamma-1}}} & \text{if } P_r \leq P_{critical} \end{cases}, \text{ where} \quad (14)$$

$$P_{critical} = \left(\frac{2}{\gamma+1}\right)^{\frac{\gamma}{\gamma-1}} = 0.528 \text{ for air}, \quad (15)$$

and where γ is a specific heat constant that is between approximately 1.3 and 1.4 for air. $P_{critical}$ is defined as the pressure ratio at which the velocity of the air flowing past the throttle valve 112 equals the velocity of sound, which is referred to as choked or critical flow. The compressible flow module 464 outputs the desired throttle area to the throttle actuator module 116, which controls the throttle valve 112 to provide the desired throttle area.

TMM4 422 calculates the desired throttle area based on the corrected torque output by TMM3 417. TMM4 422 uses the same models employed in the inverse MAP module 452, inverse APC module 428, MAF calculation module 456, and compressible flow module 464 to determine desired throttle area. TMM4 422 also includes copies of parameters employed by each of the modules 452, 428, 456, 464. Parameters may include engine speed, exhaust gas recirculation state, intake and exhaust cam position, spark timing, and whether the cylinders are inactive. TMM4 422 may verify the parameters of each module 452, 428, 456, 464 by comparing the parameters used by each module 452, 428, 456, 464 to the copies stored by TMM4 422. TMM4 422 compares the desired throttle area output by the compressible flow module 464 to the desired area determined by TMM4 422. TMM4 422 instructs the throttle actuator module 116 to use a previously determined throttle area if the desired throttle area output by the compressible flow module 464 differs from the desired area determined by TMM4 422 by more than a predetermined offset. The previously determined throttle area may include a throttle area used by the throttle actuator module 116 before the area output by the compressible flow module 464 differed from the desired area.

Figure 5A:
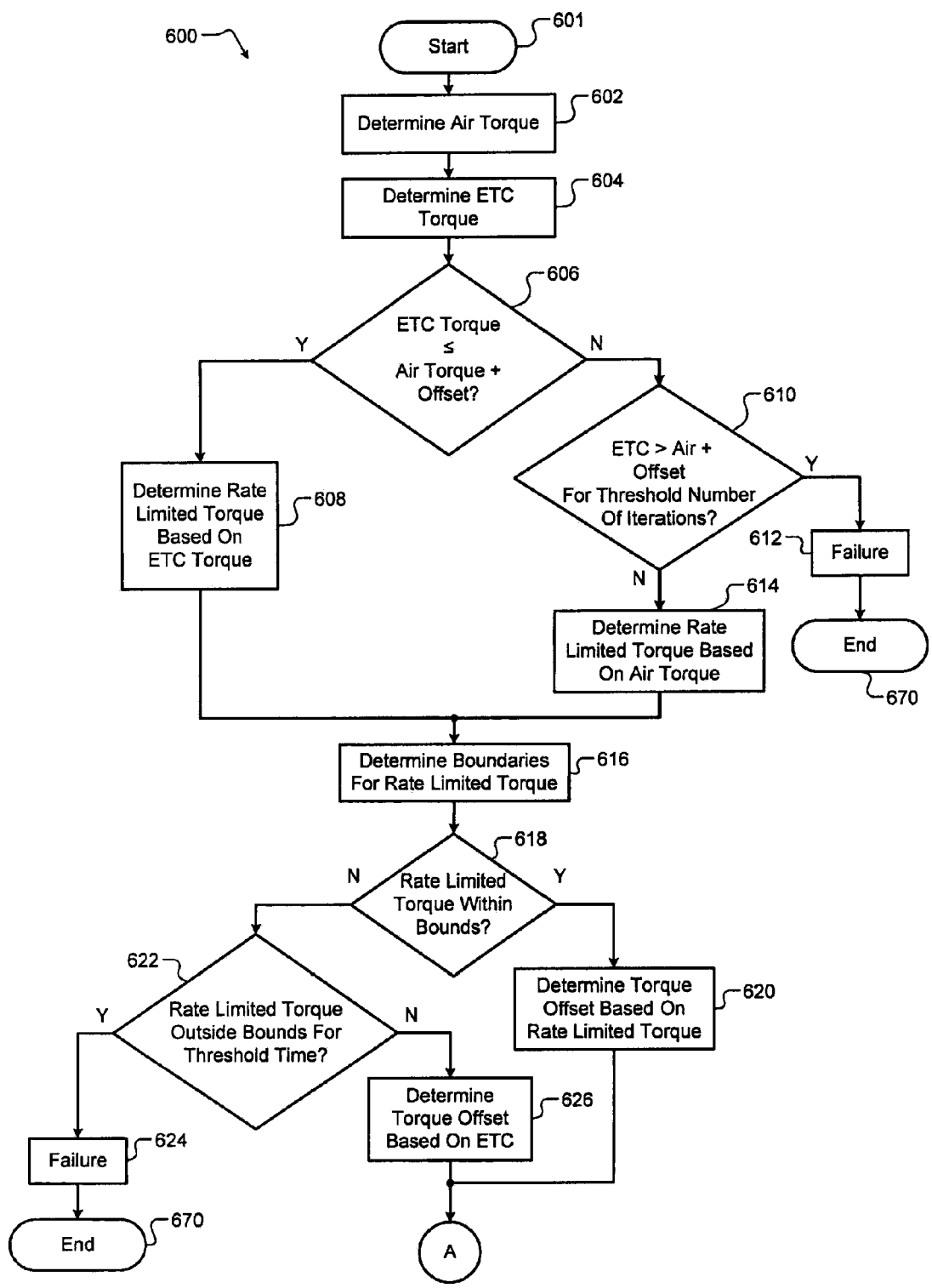
FIG. 5A is a flowchart illustrating a portion of the torque monitoring method according to the principles of the present disclosure.
Figure 5B:
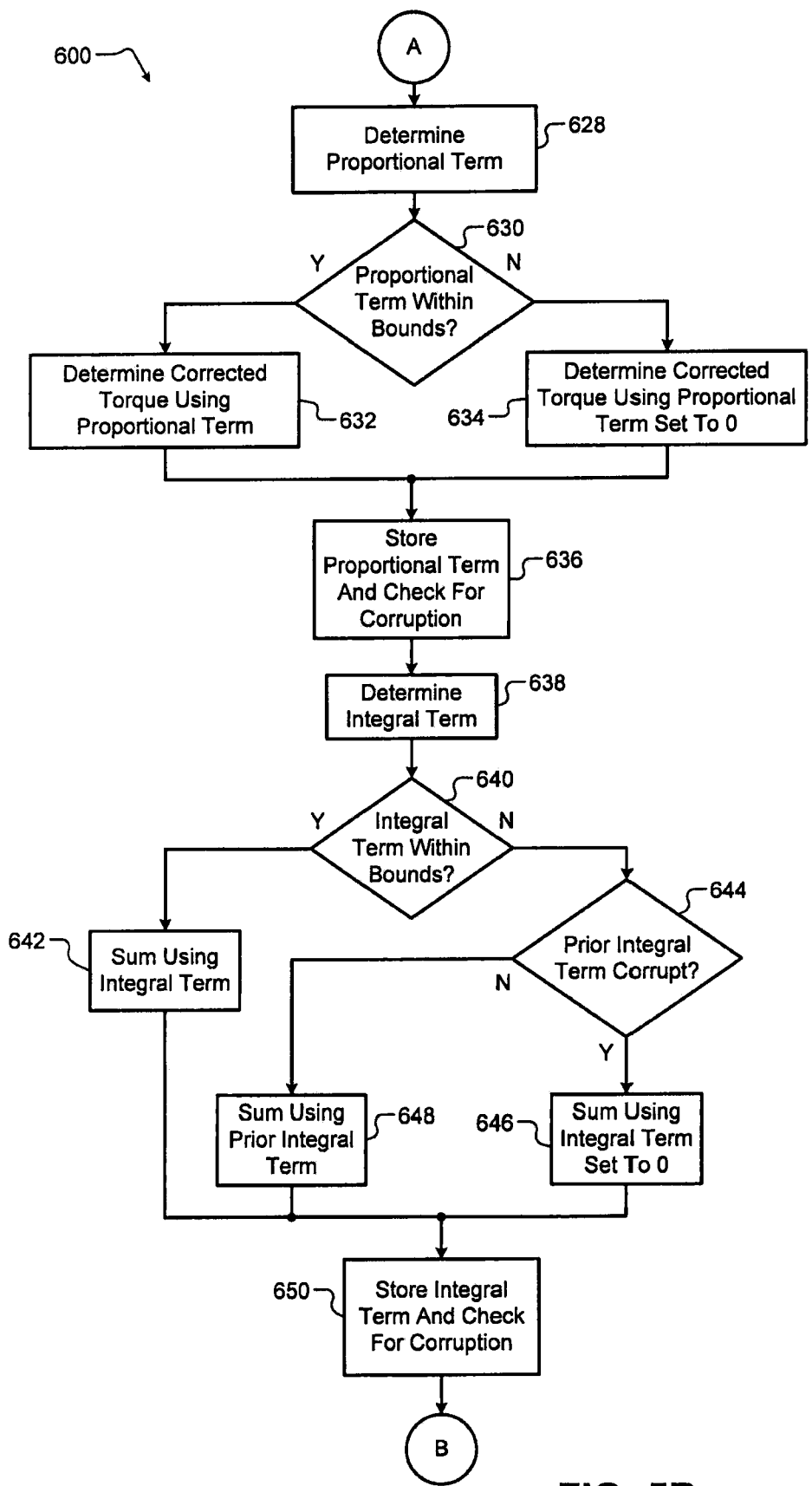
FIG. 5B is a flowchart illustrating a portion of the torque monitoring method according to the principles of the present disclosure.
Figure 5C:
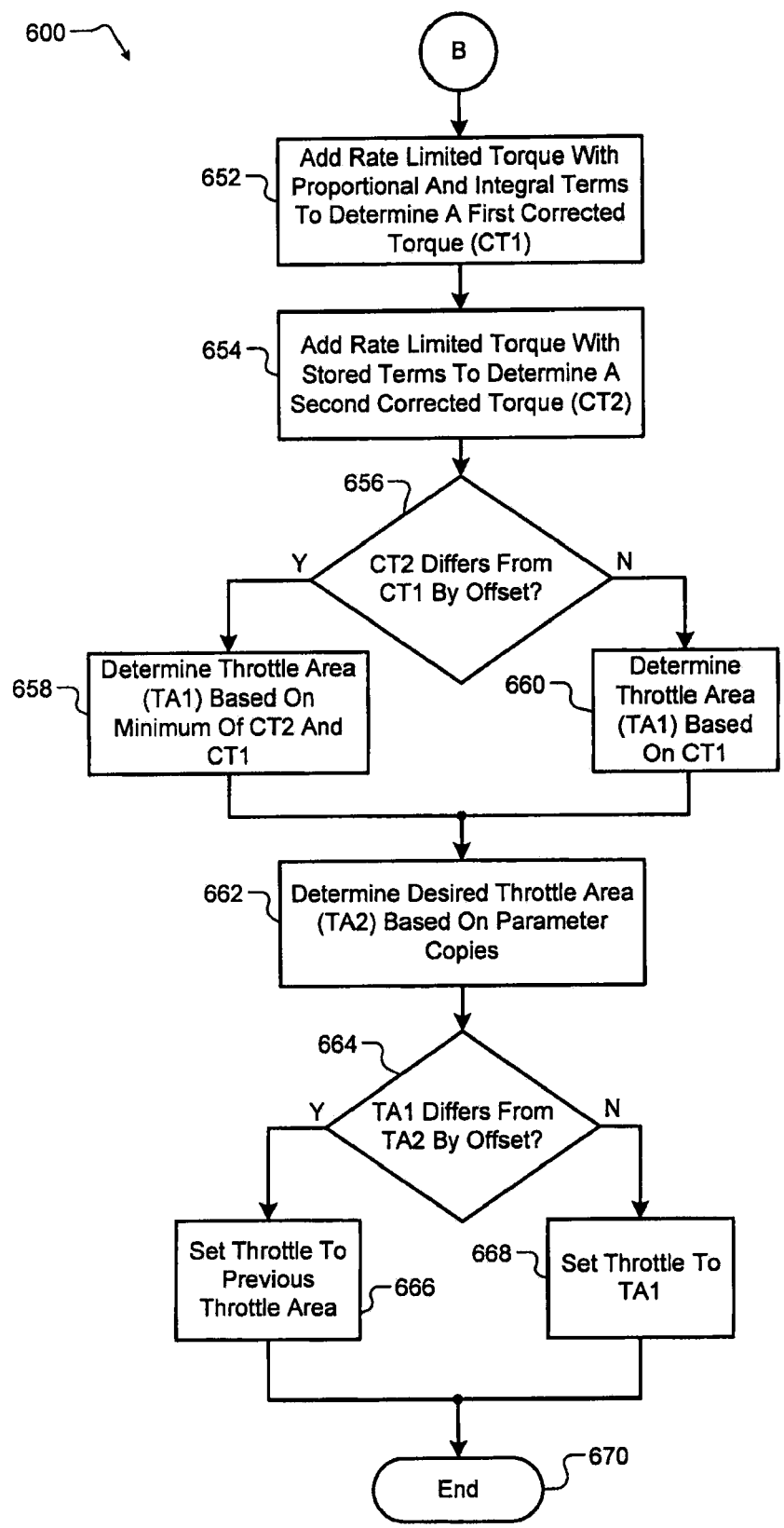
FIG. 5C is a flowchart illustrating a portion of the torque monitoring method according to the principles of the present disclosure.

Referring now to FIGS. 5A-5C, a torque monitoring method 600 starts in step 601. In step 602, the actuation module 224 determines an air torque. In step 604, the DAR module 402 determines an ETC torque. In step 606, TMM1 403 determines whether ETC torque is less than or equal to air torque plus the corresponding offset. If true, the method continues to step 608. If false, the method continues to step 610. In step 608, the driver torque filter 408 and rate limit module 410 determine a rate limited torque based on ETC torque.

In step 610, TMM1 403 determines whether ETC torque has been greater than air torque plus the corresponding offset for a threshold number of iterations. If true, the method 600 continues to step 612. In step 612, a failure is declared. If false, the method 600 continues to step 614. In step 614, the driver torque filter 408 and the rate limit module 410 determine a rate limited torque based on air torque.

In step 616, TMM2 413 determines maximum and minimum boundaries for the rate limited torque. In step 618, TMM2 413 determines whether the rate limited torque is within the maximum and minimum boundaries. If true, the method 600 continues to step 620. If false, the method 600 continues to step 622. In step 620, the closed-loop control module 412 determines a torque offset based on the rate limited torque.

In step 622, TMM2 413 determines whether the rate limited torque has been outside of the boundaries for a threshold period. If true, the method 600 continues to step 624. In step 624, a failure is declared. If false, the method continues to step 626. In step 626, the closed-loop control module 412 determines the torque offset based on ETC torque.

In step 628, the closed-loop control module 412 determines a proportional term. In step 630, TMM3 417 determines whether the proportional term is within a predetermined tolerance. If true, the method 600 continues in step 632. If false, the method 600 continues in step 634. In step 632, the summation module 416 determines the corrected torque using the proportional term. In step 634, the summation module 416 determines the corrected torque using the proportional term set to zero. In step 636, TMM3 417 stores the proportional term in memory 424 and checks the stored value for corruption.

In step 638, the closed-loop control module 412 determines an integral term. In step 640, TMM3 417 determines whether the integral term is within a predetermined tolerance. If true, the method 600 continues in step 642. If false, the method 600 continues in step 644. In step 642, the summation module 416 determines the corrected torque using the integral term. In step 644, TMM3 417 determines whether the integral term stored from the prior iteration is corrupted. If true, the method 600 continues in step 646. If false, the method 600 continues in step 648. In step 646, the summation module 416 determines the corrected torque using the integral term set to zero. In step 648, the summation module 416 determines the corrected torque using the prior integral term. In step 650, TMM3 417 stores the integral term in memory 424 and checks the stored value for corruption.

In step 652, the summation module 416 determines a first corrected torque (CT1) based on the addition of the rate limited torque and the torque offset. In step 654, TMM3 417 determines a second corrected torque (CT2) based on the rate limited torque and the stored proportional and integral terms stored in step 636 and 650, respectively. In step 656, TMM3 417 determines whether CT2 differs from CT1 by more than a predetermined offset. If true, the method 600 continues in step 658. If false, the method 600 continues in step 660.

In step 658 the desired throttle area (TA1) is determined based on the minimum of CT2 and CT1. In step 660 the desired throttle area (TA1) is determined based on CT1. In step 662, TMM4 422 determines a desired throttle area (TA2). In step 664, TMM4 422 determines whether the desired throttle area (TA1) differs from the desired throttle area (TA2) by more than a predetermined offset. If true, the method 600 continues in step 666. If false, the method 600 continues in step 668. In step 666, the throttle actuator module 116 sets the throttle area to a previously determined throttle area. In step 668, the throttle actuator module 116 sets the throttle area to TA1. The torque monitoring method 600 ends in step 670.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. An engine system comprising:
   a throttle actuator module that controls a throttle actuator based on a desired throttle area; and
   a torque control module that determines an actuator torque and that determines a rate limited torque, a maximum torque, and a minimum torque based on said actuator torque and a predetermined rate of change,
   wherein said desired throttle area is determined based on said actuator torque when said rate limited torque is greater than said maximum torque and when said rate limited torque is less than said minimum torque.

2. The engine system of claim 1 wherein said desired throttle area is determined based on said rate limited torque when said rate limited torque is less than said maximum torque and greater than said minimum torque.

3. The engine system of claim 1 wherein said predetermined rate of change is based on a vehicle acceleration threshold.

4. The engine system of claim 3 wherein said vehicle acceleration threshold includes an acceleration of 0.18-0.2 g in a 200 millisecond time frame.

5. The engine system of claim 1 wherein said actuator torque includes an electronic throttle control torque.

6. The engine system of claim 5 wherein said electronic throttle control torque is based on a future torque to meet a driver torque request.

7. The engine system of claim 6 wherein said torque control module determines said rate limited torque based on said future torque when said actuator torque is greater than said future torque.

8. The engine system of claim 6 wherein said torque control module determines said rate limited torque based on said actuator torque when said actuator torque is less than said future torque.

9. The engine system of claim 1 wherein said torque control module determines a corrected torque based on an estimated air torque, said rate limited torque, and said predetermined rate of change.

10. The engine system of claim 9 wherein said torque control module determines said desired throttle area based on said corrected torque.

11. The engine system of claim 10 wherein said torque control module determines a plurality of said desired throttle areas based on said corrected torque.

12. The engine system of claim 11 wherein said torque control module determines said desired throttle area based on said plurality of said desired throttle areas.

13. An engine control method comprising:
controlling a throttle actuator based on a desired throttle area;
determining an actuator torque;
determining a rate limited torque, a maximum torque, and a minimum torque based on said actuator torque and a predetermined rate of change; and
determining said desired throttle area based on said actuator torque when said rate limited torque is greater than said maximum torque and when said rate limited torque is less than said minimum torque.

14. The engine control method of claim 13 further comprising determining said desired throttle area based on said rate limited torque when said rate limited torque is less than said maximum torque and greater than said minimum torque.

15. The engine control method of claim 13 further comprising determining said predetermined rate of change based on a vehicle acceleration threshold.

16. The engine control method of claim 15 further comprising determining said predetermined rate of change based on an acceleration of 0.18-0.2 g in a 200 millisecond time frame.

17. The engine control method of claim 13 further comprising determining an electronic throttle control torque.

18. The engine control method of claim 17 further comprising determining said electronic throttle control torque based on a future torque to meet a driver torque request.

19. The engine control method of claim 18 further comprising determining said rate limited torque based on said future torque when said actuator torque is greater than said future torque.

20. The engine control method of claim 18 further comprising determining said rate limited torque based on said actuator torque when said actuator torque is less than said future torque.

21. The control method of claim 13 further comprising determining a corrected torque based on an estimated air torque, said rate limited torque, and said predetermined rate of change.

22. The engine control method of claim 21 further comprising determining said desired throttle area based on said corrected torque.

23. The engine control method of claim 22 further comprising determining a plurality of said desired throttle areas based on said corrected torque.

24. The engine control method of claim 23 further comprising determining said desired throttle area based on said plurality of said desired throttle areas.

* * * * *